(12) United States Patent
Bhat et al.

(10) Patent No.: US 12,090,880 B2
(45) Date of Patent: Sep. 17, 2024

(54) SYSTEM AND METHOD FOR DETERMINING AN ALIGNMENT OF AN APPARATUS COIL

(71) Applicant: GE Intellectual Property Licensing, LLC, Niskayuna, NY (US)

(72) Inventors: Suma Memana Narayana Bhat, Bangalore (IN); Deepak Aravind, Bangalore (IN); Viswanathan Kanakasabai, Bangalore (IN); Adnan Kutubuddin Bohori, Bangalore (IN)

(73) Assignee: GE Intellectual Property Licensing, LLC, Niskayuna, NY (US)

( * ) Notice: Subject to any disclaimer, the term of this patent is extended or adjusted under 35 U.S.C. 154(b) by 0 days.

(21) Appl. No.: 17/048,424

(22) PCT Filed: Apr. 17, 2019

(86) PCT No.: PCT/US2019/027787
§ 371 (c)(1),
(2) Date: Oct. 16, 2020

(87) PCT Pub. No.: WO2019/204377
PCT Pub. Date: Oct. 24, 2019

(65) Prior Publication Data
US 2021/0078426 A1 Mar. 18, 2021

(30) Foreign Application Priority Data
Apr. 19, 2018 (IN) .............................. 201841014937

(51) Int. Cl.
*B60L 53/38* (2019.01)
*B60L 53/12* (2019.01)
(Continued)

(52) U.S. Cl.
CPC ............... *B60L 53/38* (2019.02); *B60L 53/12* (2019.02); *H02J 50/10* (2016.02); *H02J 50/402* (2020.01); *H02J 50/90* (2016.02); *H02J 50/80* (2016.02)

(58) Field of Classification Search
CPC ........ B60L 53/38; B60L 53/12; H02J 50/402; H02J 50/10; H02J 50/90; H02J 50/80; H02J 50/60
See application file for complete search history.

(56) References Cited

U.S. PATENT DOCUMENTS

| 1,866,751 A | 7/1932 | Butow |
| 8,248,028 B2 | 8/2012 | Toya et al. |

(Continued)

FOREIGN PATENT DOCUMENTS

| CN | 101394022 | 11/2012 |
| CN | 107306054 | 11/2020 |

(Continued)

OTHER PUBLICATIONS

"PCT Application No. PCT/US2019/027787 International Preliminary Report on Patentability", Oct. 29, 2020, 8 pages.

(Continued)

*Primary Examiner* — Rexford N Barnie
*Assistant Examiner* — Rasem Mourad
(74) *Attorney, Agent, or Firm* — DeLizio, Peacock, Lewin & Guerra, LLP (57) ABSTRACT

A method includes utilizing a detection device comprising a detection mat having a plurality of detection coils, and at least one pair of groups of detection coils having a first group of detection coils and a second group of detection coils, and where the first group of detection coils includes a first impedance value, and a second group of detection coils includes a second impedance value. The method further (Continued)

includes determining alignment parameters representative of electromagnetic coupling between at least one pair of groups of detection coils of the detection mat and an electromagnetic field generated by an apparatus coil, and comparing the alignment parameters with a reference. The method also includes generating a control signal indicative of an alignment position of the apparatus coil with respect to the detection mat based on the compared alignment parameters.

14 Claims, 5 Drawing Sheets

(51) Int. Cl.
*H02J 50/10* (2016.01)
*H02J 50/40* (2016.01)
*H02J 50/80* (2016.01)
*H02J 50/90* (2016.01)

(56) References Cited

U.S. PATENT DOCUMENTS

| | | | |
|---|---|---|---|
| 9,178,361 | B2 | 11/2015 | Liu et al. |
| 9,260,026 | B2 | 2/2016 | Miller et al. |
| 9,404,954 | B2 | 8/2016 | Roy et al. |
| 9,410,823 | B2 | 8/2016 | Widmer et al. |
| 9,825,486 | B2 | 11/2017 | Liu et al. |
| 10,361,594 | B2 | 7/2019 | Huang |
| 10,371,848 | B2 | 8/2019 | Roy et al. |
| 10,804,748 | B2 | 10/2020 | Wu et al. |
| 11,685,269 | B2 | 6/2023 | Kanakasabai |
| 2010/0148907 | A1 | 6/2010 | Younsi et al. |
| 2013/0099592 | A1 | 4/2013 | Abe |
| 2013/0128396 | A1 | 5/2013 | Danesh et al. |
| 2014/0015329 | A1 | 1/2014 | Widmer et al. |
| 2014/0103733 | A1 | 4/2014 | Irie et al. |
| 2014/0111019 | A1 | 4/2014 | Roy et al. |
| 2014/0111154 | A1* | 4/2014 | Roy ................... H01F 38/14 320/108 |
| 2014/0375256 | A1 | 12/2014 | Lee et al. |
| 2015/0022012 | A1* | 1/2015 | Kim .................. H04W 52/285 307/104 |
| 2015/0109000 | A1 | 4/2015 | Sieber et al. |
| 2015/0137801 | A1* | 5/2015 | Raedy ................ H02J 7/00034 324/207.15 |
| 2015/0276965 | A1 | 10/2015 | Turki |
| 2015/0311725 | A1 | 10/2015 | Yamamoto et al. |
| 2016/0282500 | A1 | 9/2016 | Filippenko et al. |
| 2016/0285312 | A1* | 9/2016 | Maniktala ............ H01F 38/14 |
| 2016/0336759 | A1 | 11/2016 | Yamamoto et al. |
| 2017/0025904 | A1 | 1/2017 | Roy et al. |
| 2017/0054333 | A1 | 2/2017 | Roehrl et al. |
| 2017/0324252 | A1 | 11/2017 | Yamamoto et al. |
| 2017/0328740 | A1 | 11/2017 | Widmer et al. |
| 2017/0353061 | A1* | 12/2017 | Maniktala ............ H02J 50/005 |
| 2017/0363763 | A1* | 12/2017 | Yamamoto ............ H02J 50/10 |
| 2018/0015832 | A1* | 1/2018 | Nguyen ............... B60L 53/12 |
| 2018/0026482 | A1* | 1/2018 | Asano ................. H02J 7/00 307/104 |
| 2018/0054091 | A1 | 2/2018 | Liu et al. |
| 2018/0083349 | A1* | 3/2018 | Sieber ................. B60L 53/39 |
| 2018/0166928 | A1* | 6/2018 | Wu .................... H01F 27/2885 |
| 2018/0316229 | A1* | 11/2018 | Anwer ................ H04B 5/0081 |
| 2018/0366985 | A1* | 12/2018 | Henkel ................ B60L 53/12 |
| 2019/0027973 | A1* | 1/2019 | Baek .................. B60L 53/126 |
| 2019/0097471 | A1 | 3/2019 | Pantic et al. |
| 2019/0103771 | A1* | 4/2019 | Piasecki ............. H04B 5/0037 |
| 2019/0331822 | A1 | 10/2019 | Miyamoto |
| 2019/0363588 | A1 | 11/2019 | Daetwyler et al. |
| 2020/0232819 | A1 | 7/2020 | Widmer et al. |
| 2020/0266671 | A1 | 8/2020 | Choi et al. |
| 2020/0290467 | A1* | 9/2020 | Gao .................... B60L 53/38 |
| 2020/0328616 | A1 | 10/2020 | Van Wageningen et al. |
| 2021/0138917 | A1 | 5/2021 | Kanakasabai et al. |
| 2021/0215845 | A1 | 7/2021 | Tejeda et al. |
| 2023/0331103 | A1 | 10/2023 | Kanakasabai et al. |

FOREIGN PATENT DOCUMENTS

| | | |
|---|---|---|
| JP | 2014126513 | 7/2014 |
| JP | 2015216828 | 12/2015 |
| JP | 2015223009 | 12/2015 |
| JP | 2016502385 | 1/2016 |
| KR | 1020180020166 | 2/2018 |
| KR | 20200064934 | 6/2020 |
| WO | 2011142419 | 11/2011 |
| WO | 2019057777 | 3/2019 |
| WO | 2019204376 | 10/2019 |
| WO | 2019204377 | 10/2019 |
| WO | 2019204379 | 10/2019 |
| WO | 2019219208 | 11/2019 |
| WO | 2022177948 | 8/2022 |

OTHER PUBLICATIONS

"PCT Application No. PCT/US2019/027787 International Search Report", Aug. 9, 2019, 12 pages.
"India Application No. 201841014937 Examination Report", Jan. 21, 2020, 6 pages.
"European Application No. 19788677.3 European Search Report", Nov. 23, 2021, 9 pages.
"India Application No. 201841014936 Examination Report", Jan. 29, 2020, 6 pages.
"PCT Application No. PCT/US2019/027789 International Search Report and Written Opinion", Aug. 7, 2019, 12 pages.
"PCT Application No. PCT/US2022/016543 Invitation to Pay Additional Fees and, Where Applicable, Protest Fee", May 23, 2022, 13 pages.
"U.S. Appl. No. 17/046,574 Office Action", Apr. 14, 2022, 20 pages.
"PCT Application No. PCT/US2022/016543 International Search Report and Written Opinion", Aug. 11, 2022, 41 pages.
"Japan patent application No. 2020-556814 First Office Action", Feb. 15, 2023, 3 pages.
"India Application No. 202111006541 Examination Report", Feb. 5, 2024, 7 pages.
"Korea patent application No. 10-2020-7033326 Request for the Submission of an Opinion", Jan. 26, 2024, 2 pages.
"U.S. Appl. No. 18/338,890 Non Final Office Action", Jan. 18, 2024, 26 pages.

\* cited by examiner

SYSTEM AND METHOD FOR DETERMINING AN ALIGNMENT OF AN APPARATUS COIL

BACKGROUND

Embodiments of the present specification relate to a wireless power transfer system, and more particularly, embodiments of the present specification relate to a system and method for determining an alignment in a wireless power transfer (WPT) system.

Conventional wireless power transfer (WPT) systems work on the principle of inductive power transfer to wirelessly transfer energy from one device to another. Typically, in the WPT systems, a primary power device, such as a transmitter, transmits power wirelessly to a secondary power device, referred to as a receiver. The transmitter and receiver include respective electromagnetic coils. During operation of a WPT system, when the current is passed through a transmitter coil, a magnetic field is generated, this magnetic field induces an electromotive force in a receiver coil, thereby wirelessly transferring power from the transmitter to the receiver.

Generally, the WPT system transfers power most effectively when there is strong coupling and effective alignment between the transmitter and receiver. However, desirable or effective alignment of the transmitter and receiver of a WPT system remains a challenge. When the transmitter and receiver are misaligned, the coupling between the transmitter and receiver reduces and the power transfer between the transmitter and receiver takes place at a reduced efficiency. Consequently, it takes longer to transfer a given amount of power, thereby making the process relatively less effective and more time consuming. The effectiveness of the wireless power transfer process comes down with the increase in degree of misalignment. In some cases, where misalignment is extreme, power transfer may be ineffective. In such cases, no measurable power transfer occurs during charging.

Further, alignment of the transmitter and receiver may be difficult, for example, in automotive applications, such as electric vehicle charging. In electric vehicles, the receiver is typically located on an underside of a vehicle, which may be out of view of the driver of the vehicle, and a transmitter is situated on the ground. In such circumstances, alignment of the transmitter and receiver may be difficult and can reduce power transfer efficiency and/or efficacy. Several factors may contribute to the challenges associated with alignment of the WPT transmitters and WPT receivers. Example of such factors may include the relatively small size of the WPT transmitters/receivers, vehicle to vehicle dimensional variations and limited capacity for the vehicle driver to see the WPT receiver and/or the WPT transmitter.

BRIEF DESCRIPTION

In one embodiment, a method includes utilizing a detection device comprising a detection mat having a plurality of detection coils, and at least one pair of groups of detection coils. The at least one pair of groups of detection coils includes a first group of detection coils and a second group of detection coils, and where the first group of detection coils includes a first impedance value, and a second group of detection coils includes a second impedance value. The method further includes determining alignment parameters representative of electromagnetic coupling between at least one pair of groups of detection coils of the detection mat and an electromagnetic field generated by an apparatus coil, and comparing the alignment parameters with a reference. The method also includes generating a control signal indicative of an alignment position of the apparatus coil with respect to the detection mat based on the compared alignment parameters.

In another embodiment, an alignment system includes a detection device having detection mat. The detection mat includes a plurality of detection coils, and at least one pair of groups of detection coils, where the at least one pair of groups of detection coils includes a first group of detection coils and a second group of detection coils. The first group of detection coils includes a first impedance value, and a second group of detection coils comprises a second impedance value. The detection device also includes a sensing unit operatively coupled to the detection mat and configured to determine alignment parameters representative of electromagnetic coupling between at least one pair of groups of detection coils of the detection mat and an electromagnetic field generated by an apparatus coil. Further, the detection device includes a comparison sub-system operatively coupled to the detection mat and configured to receive a differential current signal from the at least one pair of groups of detection coils, wherein the comparison sub-system is configured to transmit a control signal based on the differential current signal.

DRAWINGS

These and other features and aspects of embodiments of the invention will become better understood when the following detailed description is read with reference to the accompanying drawings in which like characters represent like parts throughout the drawings, wherein.

DETAILED DESCRIPTION

Embodiments of the present specification relate to methods and systems for determining an alignment between a detection mat and an apparatus coil, where the apparatus coil is an electromagnetic coil. In one example, the methods and systems may be used for detection of alignment in a wireless power transfer (WPT) system. In certain embodiments, the alignment in the WPT system refers to an alignment of a receiver unit of the WPT system and the transmitter unit of the WPT system, to ensure optimal power transfer from the transmitter unit to the receiver unit. The alignment is detected before starting the wireless power transfer between a transmitter unit and a receiver unit of the WPT.

As used herein, the term "primary magnetic field" refers to a magnetic field that is induced by a transmitter unit of the WPT system. The term "operative environment" of the WPT system is defined by the primary magnetic field in the WPT system, where the primary magnetic field of a transmitter unit of the WPT system is detectably present.

As used herein, the term "group of detection coils" refers to a singular detection coil or two or more coils, where detection coils of each individual group are electrically coupled to one another. Further, the term "pair of groups of detection coils" refers to two groups of coils.

Some electric vehicles (EVs) and hybrid vehicles are charged by wireless power transfer or inductive power transfer using WPT systems. The WPT systems are primarily made of two parts, a transmitter unit that is part of a charging station, and a receiver unit that is disposed in an electric vehicle (EV). The transmitter unit of the charging station is inductively coupled to the receiver unit of the EV. Typically, transfer of power is initiated between coils of the transmitter and receiver units when the EV is brought in the charging station and power supply to the transmitter unit is started.

Often, initially the receiver unit may not be aligned with the transmitter unit, and this may result in ineffective charging and higher charging time for an apparatus, such as an EV being charged. Since the receiver coil is typically disposed on an underside of the EV, it is visually not feasible to easily detect the alignment of the receiver unit with respect to the transmitter unit. The transmitter unit is often stationary, hence in certain embodiments, in case of misalignment between the receiver unit and the transmitter unit, the receiver unit is repositioned for enhanced alignment with respect to the transmitter unit. By way of example, upon detection of misalignment of the receiver and transmitter units, the EV may be repositioned to a new position for optimal alignment.

Figure 1:
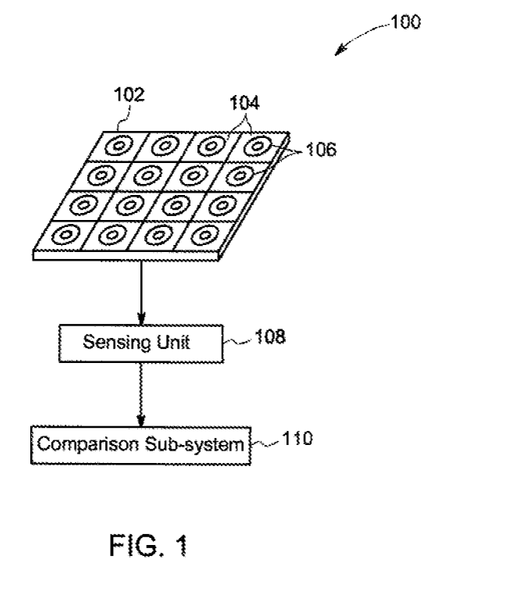
FIG. 1 is a diagrammatical illustration of an example detection device for determining an alignment of an apparatus coil, in accordance with aspects of the present specification.

FIG. 1 illustrates a detection device 100 that includes a detection mat 102 having a plurality of detection zones 104. The detection device 100 is used to detect an alignment between the detection mat and an apparatus coil (not shown in FIG. 1). In some embodiments, the apparatus coil may be a receiver coil or a transmitter coil of a WPT system (not shown in FIG. 1). In some of these embodiments, the detection device 100 may be used for detecting an alignment in the WPT system. The alignment in the WPT system refers to an alignment between a receiver coil of the receiver unit and a transmitter coil of the transmitter unit, the alignment is determined with the aid of the detection device 100. In certain embodiments, during detection of the alignment, the detection mat 102 of the detection device 100 may be disposed on the transmitter coil or the receiver coil, or disposed between the transmitter and receiver coils. In some embodiments, initially, the detection mat 102 may be aligned with respect to the apparatus coil, that is one of the transmitter or receiver coil and alignment may be detected with respect to the detection mat 102 and other of the transmitter and receiver coils. By way of example, if initially, the detection mat 102 is disposed on the transmitter coil or transmitter unit, such that the detection mat 102 is aligned with the transmitter coil of the transmitter unit, the detection for alignment may be performed with respect to the detection mat 102 and the receiver coil of the receiver unit. It may be noted that a surface area of the detection mat 102 may be same as or greater than a surface of an electromagnetic coil on which the detection mat 102 may be disposed.

In addition to the detection mat 102, the detection device 100 includes a sensing unit 112, and a comparison subsystem 114. Further, the detection mat 102 includes at least one pair of groups (not shown in FIG. 1) of detection coils 106, where the at least one pair of groups of detection coils 106 includes a first group of detection coils 106 and a second group of detection coils 106. Moreover, the first group of detection coils 106 has a first impedance value, and a second group of detection coils 106 has a second impedance value. The groups of detection coils 106 will be explained with regard to FIGS. 2A-2B.

Further, the detection mat 102 may include several geometric locations, also referred to as "detection zones" 104. The detection zones 104 define discrete regions of the detection mat 102, where each detection zone 104 includes one or more groups of detection coils 106. It may be noted that the detection zones 104 may not be physically separated or isolated from one another, the detection zones 104 may be electrically isolated or de-coupled from one another. Further, in instances where one or more detection zones 104 include two or more groups of detection coils 106, each individual group of detection coils is initially electrically de-coupled from one another. Further, the detection zones 104 may have geometric or non-geometric shapes.

The detection mat 102 may be a flexible mat, a conformable mat, a rigid mat or a plug & play mat, standalone mat. It may be noted that a surface area of the detection mat 102 is greater than or equal to a surface of a transmitter unit on which the detection mat 102 is disposed. The detection mat 102 may be made of electrically insulating material. The detection mat 102 may be made of mechanical wear resistant material to withstand movement of electric vehicle over it. The detection mat 102 may further be designed for outdoor application and designed to withstand temperature, humidity and may be resistant to water ingress.

In some embodiments, the detection coils 106 may be disposed on the detection mat 102 or may be embedded in the detection mat 102 for user safety and aesthetics. In some other embodiments, the detection coils 106 may be printed, molded, woven, or additively manufactured on the detection mat 102.

The detection coils 106 are electromagnetic coils. In the illustrated embodiment of FIG. 1, the detection coils 106 are used for representative purposes, it may be noted that each detection coil 106 may include spiral or other coil topologies, further, each detection zone 104 may have one or more detection coils 106. In certain embodiments, the groups of detection coils 106 may include various coil topologies, shapes, and geometrical arrangement of the detection coils 106. Non-limiting examples of shapes of the detection coils 106 may include helical coils, spiral coils, non-circular, and the like. Different detection coils 106 or groups of detection coils 106 present on the detection mat 102 may have same or different impedance values.

Each pair of groups of detection coils 106 includes two groups that are disposed at same or different geometric locations on the detection mat 102 to form the pair of groups of detection coils 106. By way of example, the two groups of the pair may be disposed in the same detection zone 104, or may be disposed in two different detection zones 104. In a non-limiting example, each group of detection coils 106 may include concentric coils, adjacently disposed coils, a side-by-side arrangement of coils. Further, one or more groups of detection coils 106 may be disposed in a single plane, or two or more layers. The detection coils 106 within a group of detection coils 106 may be connected in a series connection, a parallel connection, or a combination of the series and parallel connections.

In some embodiments, a pair of groups of detection coils 106 includes concentric coils. In a non-limiting example, inductance value of one of the two concentric coils is different than an inductance value of another concentric coil. By way of example, while an inductance value of one concentric coil of the pair of concentric coils may be represented by L, an inductance value of another concentric coil of the pair of concentric coils may be represented as nL.

The groups of detection coils 106 of the detection device 100 are configured to be excited or energized by an electromagnetic field generated by an apparatus coil, such as an electromagnetic field generated by a receiver coil of a receiver unit. In certain embodiments, the excited detection coils 106 provide electrical parameters, referred to as, "alignment parameters." The alignment parameters are representative of electromagnetic coupling between the detection coils 106 of the detection mat and the electromagnetic field of the apparatus coil. The alignment parameters may be determined for one or more pairs of detection coils 106.

Although the following description is presented primarily with respect to the apparatus coil being a receiver coil, however, it may be noted that apparatus coil being a transmitter coil is also entailed within the purview of the present application. Upon being electrically excited, the apparatus coil, such as a receiver coil of a receiver unit generates an electromagnetic field. This electromagnetic field interacts with the detection device 100 to induce a voltage in one or more groups of detection coils 106 of the detection device 100. Due to the symmetric nature of the electromagnetic field, in instances where a receiver coil of the receiver unit is aligned with a detection mat 102, diagonally opposite ends of the detection mat 102 experience similar electromagnetic fields. Consequently, similar amount of voltage is induced in these detection coils 106 disposed at diagonally opposite locations of the detection mat 102. Likewise, in instances where the receiver coil of the receiver unit is not aligned suitably with respect to a detection mat 102, the voltages induced due to the electromagnetic field of the receiver coil may not be similar for the detection coils 106 disposed at diagonally opposite locations of the detection mat 102.

The sensing unit 108 of the detection device 100 is configured to sense an alignment parameter of the detection device 100, where the alignment parameter is generated by a pair of groups of detection coils 106 of the detection mat 102 in response to the electromagnetic field of the apparatus coil, such as the receiver coil. In some embodiments, the sensing unit 108 includes a current sensor that can sense current signal and generate signal proportional to the sensed current signal. In some other embodiments, the sensing unit 108 may include a voltage sensor for measuring voltage generated in the detection coils in response to the electromagnetic field of the receiver coil. In certain embodiments, the sensing unit 108 may include both current and voltage sensors.

The detection device 100 further includes a comparison sub-system 110 operatively coupled to the detection mat 102 and the sensing unit 108. The comparison sub-system 110 is configured to receive the sensed alignment parameters from the sensing unit 108. Further, the comparison sub-system 110 is configured to generate a control signal representative of the alignment voltage signal and indicative of an alignment position of the apparatus coil, such as the receiver or transmitter coil, with respect to the detection mat 102 based on the alignment parameters.

In one embodiment, the alignment in the WPT system may be determined based on an actual current signal of at least one group of the pair of groups of detection zones 104, and a differential current signal of at least one pair of groups of the detection coils 106. It may be noted that a value of the differential current signal may be an insignificantly small value that may not be detectable when the WPT system is aligned. Particularly, when the receiver unit or receiver coil is aligned with the detection mat 102, the differential current signal from one or more pairs of groups of detection coils 106 is a non-detectable value that is zero or approaching zero.

In certain embodiments, the detection device 100 may be a standalone device that can be used with existing WPT systems. In addition to the detection mat 102, the sensing unit 108, and the comparison sub-system 110, the detection device 100 may also include a communication unit (shown in FIG. 3) which enables the detection device 100 to communicate with the WPT system as per society of automotive engineers (SAE) standards. The communication unit may be used to communicate the control signal to a control unit of the WPT system to assess whether to reposition the apparatus coil. In some embodiments, repositioning the apparatus coil includes repositioning the apparatus having the apparatus coil. By way of example, repositioning the receiver coil includes repositioning the receiver unit with respect to the transmitter unit or the detection device. In some embodiments, the control unit is configured to communicate the control signal to the apparatus coil to reposition the apparatus coil with respect to the detection mat based on the control signal. Based on the alignment voltage signal, the communication unit may also be configured to send suitable signals to a user of an EV or an operator of an EV charging station. Alternatively, or additionally, the control signal may also be communicated to one or more of an auto parking system, auto pilot system an, and an alignment guiding system to suitably reposition the EV to align the receiver unit and the transmitter unit.

Advantageously, the detection device 100 of the present technique is configured to detect alignment deviations in the range such that the system performance such as efficiency, power transfer capability etc. are not degraded with respect to an optimal alignment of the receiver and transmitter units. In one example, the method of the present application may be applied when a drop in an efficiency of a WPT system due to misalignment between the receiver and transmitter units may be greater than or equal to 0.5 percent of an expected system efficiency.

Figure 2A:
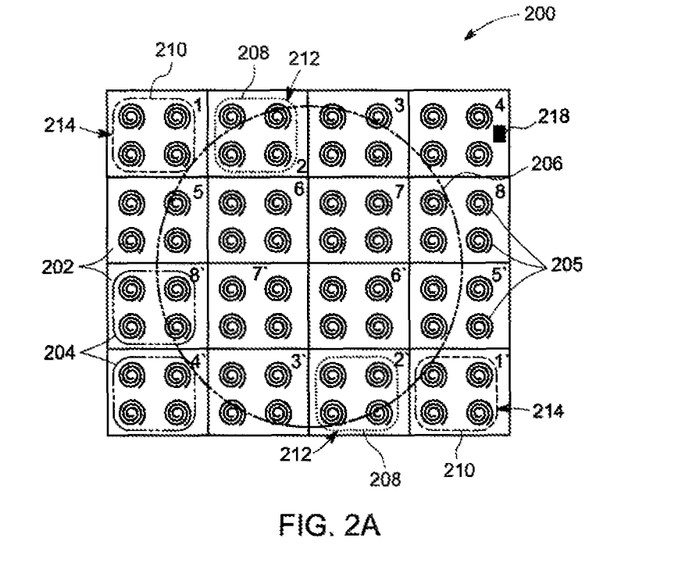
FIGS. 2A-2B are diagrammatical representations of example pairs of groups of detection coils, in accordance with aspects of the present specification.
Figure 2B:
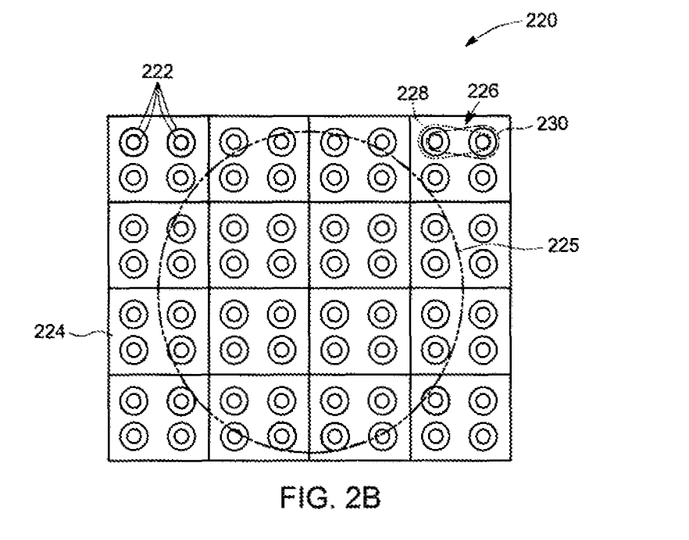

Referring now to FIGS. 2A-2B, in certain embodiments, two or more pairs of groups of detection coils of a detection device may be excited to determine a differential current signal from a detection mat, where the differential current signal is used to determine the alignment parameters. It may be noted that each of the two individual groups of the pairs of groups may include one or more detection coils.

In certain embodiments, the first and second groups of pairs of groups of detection coils are symmetrically disposed with respect to a primary magnetic field. Further, the first and second groups of pair of groups of detection coils are disposed in the same geometric region of the detection mat. In some embodiments, the first and second groups of pairs of detection coils include structurally similar arrangement of detection coils. Further, in certain embodiments, the first and second impedance values are similar when the receiver and transmitter coils are aligned. As used herein, similar impedance values refer to impedance values having a variation of less than or equal to ±0.5% of one another. By way of example, an impedance value of a first group may be within −0.5% of an impedance value of a second group, where the first and second groups form a pair of groups of detection coils. In some other embodiments, the first and second impedance values are inherently dissimilar. In particular, even when the transmitter and receiver coils of the WPT system are aligned, the first and second impedance values may be different from one another. In some of these embodiments, the detection mat may include a compensator element operatively coupled to one of the first and second groups of detection coils to compensate a difference in impedance values of the first and second groups of detection coils.

As will be described with respect to FIG. 2A, the detection coils of a particular pair of groups of detection coils are symmetrically disposed with respect to a primary magnetic field and hence are subjected to similar strength of the primary magnetic field. As will be described with respect to FIG. 2B, groups of a pair of groups of detection coils may be disposed in the same geometric region of the detection mat, therefore the groups may experience similar strength of the primary magnetic field. In some embodiments, groups of one or more pairs of groups of detection coils may include same impedance values when the WPT system exhibits alignment of the receiver and transmitter coils. In some other embodiments, even in presence of the alignment in the WPT system, the two groups of the pair of groups of detection coils have different impedance values. In these embodiments, the two groups of a pair of groups may provide negligible and non-detectable amount of differential current in association with a compensator element.

FIG. 2A illustrates an exemplary detection mat 200 having a plurality of detection zones 202 having groups 204 of detection coils 205. In the non-limiting illustrated embodiment, the detection mat 200 is shown as having 4×4 array of detection zones 202, and each detection zone 202 is illustrated as having 4 groups 204 of detection coils 205, however, it may be noted that the number of detection zones 202 in the detection mat 200, and number of groups 204 in each detection zone 202 may vary and are merely for illustrative purposes. Further, although the detection mat 200 is shown to have 16 detection zones 202 in the illustrated example, it may be noted that the number of detection zones 202 in a detection mat, such as the detection mat 200, may be one or more. Further, each group 204 may include one or more detection coils 205, the spiral shape of the detection coils 205 of the groups 204 is for illustrative purposes, the detection coils 205 may be of circular, non-circular shape, spiral, helical, and combinations thereof. The detection device 200 may be disposed on a transmitter unit (not shown in FIG. 2A) or a received unit (not shown in FIG. 2A). Further, dotted circle 206 represents an electromagnetic coil other than an apparatus coil. In one example, the dotted circle 206 represents a transmitter coil of a transmitter unit, in this example, the apparatus coil is a receiver coil of the receiver unit.

Any two groups 204 of detection coils that are likely to be subjected to similar strength of the primary magnetic field may be paired to form a pair of groups of detection coils for detecting alignment parameters. By way of example, the groups 204 referred to by reference numerals 208 are symmetrically disposed with respect to a primary magnetic field of one of the transmitter and receiver coils, and form a pair 212 of groups 208 of detection coils. Similarly, groups 210 are symmetrically disposed with respect to the primary magnetic field of same one of the transmitter and receiver coils, and form another pair 214 of groups of detection coils 210. In certain embodiments, when the detection mat 200 is disposed on the transmitter unit in such a way that the detection mat 200 is aligned with respect to the primary magnetic field of the transmitter unit, for detecting alignment parameters, detection coils 204 of one or more pairs of groups may be excited. By way of example, one of the two pairs 212 or 214 may be excited by the electromagnetic field of the apparatus coil, such as the receiver coil of the receiver unit. Further, in instances where impedance values of the two groups of a pair of groups are dissimilar, a compensator element 218 may be operatively coupled to at least one of the groups of the pair of groups of the detection coils to provide similar resultant impedance values from each of the two groups of the pair of groups of detection coils. Non-limiting example of the compensator element 218 may include inductances, resistances, capacitances in series or parallel fashion or both. Several plausible pairs of groups 204 of detection coils 205 are represented by n-n'. It may be noted that other pairs of groups 204 of detection coils 205 other than 212, 214, n-n' may also be possible.

FIG. 2B represents a detection mat 220 having a plurality of detection zones 224 having two or more detection coils 222. The detection mat 220 may be disposed on a transmitter unit (not shown in FIG. 2B). In the illustrated embodiment, the dotted circle 225 represents an electromagnetic coil, such as a transmitter coil of a transmitter unit, disposed below the detection mat 220. Further, each zone 224 includes a plurality of groups of concentric detection coils 222 disposed in each detection zone 224. It may be noted that more number of concentric coils per zone 224, or detection coils 222 having different shapes, and geometries, are envisioned within the purview of this application, and that the illustrated embodiment of FIG. 2B is a representative embodiment presented merely for illustrative purposes. A pair 226 of groups 228 and 230 of the detection coils 222 is formed in the manner illustrated. The individual groups 228 and 230 are disposed in the same geometric region, such that the detection coils 222 of the groups 228 and 230 experience similar strength of the primary magnetic field.

Alignment parameters may be determined for one or more pairs of groups of detection coils 204 to detect alignment between the receiver and the transmitter unit of the WPT system. The different pairs of groups may be detected simultaneously or sequentially.

Figure 3:
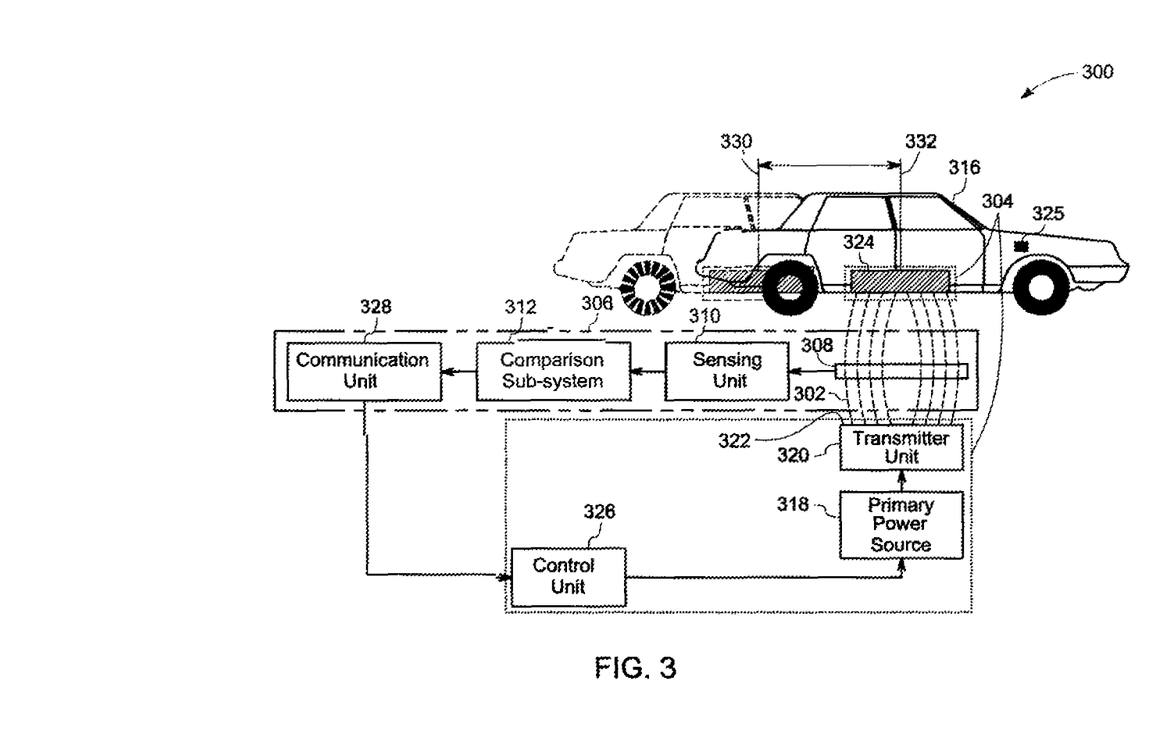
FIG. 3 is a diagrammatical representation of an example alignment system for determining an alignment of a receiver unit and a transmitter unit of a WPT system, in accordance with aspects of the present specification.

FIG. 3 illustrates an exemplary alignment system 300 for detecting an alignment in a WPT system 304. Particularly, the alignment system 300 includes a detection device 306 and the WPT system 304. The detection device 306 includes a detection mat 308, such as those described herein, including a plurality of detection coils and one or more pairs of groups of detection coils. Further, the detection device 306 also includes a sensing unit 310. The sensing unit 310 is configured to sense one or more alignment parameters. In one embodiment, the sensing unit 310 may include current and/or voltage sensors. The alignment parameters include an actual voltage pattern, an actual current pattern, a differential current pattern, a differential voltage pattern, or combinations thereof. The alignment parameters are generated when the detection coils are excited by an electromagnetic field 302 generated by an apparatus coil, such as a receiver coil of a receiver unit 324. An external power source 325, external to the WPT system 304, or such as a battery of an EV may be used to energize the apparatus coil, such as the receiver coil of the receiver unit 324.

The detection device 306 also includes a comparison sub-system 312 operatively coupled to the detection mat 308 and configured to receive the sensed alignment parameters from the sensing unit 310. Further, the comparison subsystem 312 may be configured to provide a control signal based on the alignment parameters.

In a non-limiting example, the comparison sub-system 312 includes one or more electrical windings wound around a magnetic core. The magnetic core is configured to receive the sensed alignment parameters, such as actual current signals from one or more detection zones, and one or more differential current signals from one or more pairs of detection zones. The magnetic core provides flux linkage in response to receiving the current signals from the sensing unit 310 and induce an alignment voltage signal in their respective electrical windings. The comparison sub-system 312 also includes a rectifier that receives and rectifies the alignment voltage signal. A filter filters the voltage signal before sending the same to a comparator, which compares the filtered voltage signal with a reference threshold voltage signal, and accordingly a control signal is communicated to the WPT system, such as the WPT system 304 of FIG. 3. In one example, a magnetic core may be configured to receive actual current signals and another magnetic core may be configured to receive differential current signals, and the two cores may be configured to provide respective control signals.

In some embodiments, the detection coils of the detection device 306 are used to determine alignment parameters. In certain embodiments, one or more pairs of groups of detection coils may be used to determine the alignment parameters. The WPT system 304 of the alignment system 300 includes a primary power source 318. During charging, the primary power source 318 supplies power in the form of an alternating current (AC) voltage signal to a transmitter unit 320 of the WPT system 304. The transmitter unit 320 includes at least one transmitter coil (not shown in FIG. 3). The transmitter unit 320 is configured to receive the AC voltage signal from the primary power source 318 and generate a primary magnetic field or operative environment 302 in response to the received AC voltage signal.

The detection mat 308 is operatively coupled to the transmitter unit 320. Particularly, the detection mat 308 is disposed on the transmitter unit 320 or aligned with respect to the transmitter unit 320. In some embodiments, the detection mat 308 is directly disposed on a surface 322 of the transmitter unit 320. In some other embodiments, the detection mat 308 is positioned above the transmitter unit 308, such that the detection mat 308 is disposed in the operative environment of the WPT system 304. The detection mat 308 may be disposed and aligned with respect to the transmitter coil of the transmitter unit 320. The detection mat 308 may be disposed such that the transmitter coil is geometrically symmetrically positioned with respect to the detection mat 308. Further, the detection mat 408 may be a standalone mat 308, a plug and play mat, and may have one or more of a flexible, conformal, and rigid structure.

Further, the receiver unit 324 of the WPT system 304 includes at least one receiver coil. In the presently contemplated embodiment, the receiver coil is the apparatus coil of the alignment system 300. During charging, the receiver 324 unit receives at least a portion of the primary magnetic field 302 generated by the transmitter unit 320. The receiver unit 324 may be disposed on an underside of the apparatus that needs to be charged. The receiver unit 324 may be disposed in an electric vehicle 316 that is to be charged using the WPT system 304. For optimal wireless power transfer, it is desirable to align the receiver and transmitter units 320 and 324 with respect to one another. However, when the receiver unit 324 is brought closer to the transmitter unit 320 to provide an operative coupling between the two units 320 and 324, often the receiver unit 324 is not desirably aligned with respect to the primary magnetic field 302 of the transmitter unit 320. The alignment system 300 is configured to identify such misalignment, and in some embodiments, also provide recommendation for achieving an aligned position of the receiver unit 324.

The WPT system 304 also includes a control unit 326, the control unit 326 controls operation of the primary power source 318 and is also operatively coupled to the detection device 306. The control unit 326 receives the control signal from the detection device 306. Further, the control unit 326 controls the supply of power from the primary power source 318 to the transmitter unit 320 based on the control signal.

In certain embodiments, the detection device 306 or the WPT system 304 also includes a communication unit 328 operatively coupled to the comparison sub-system 312, and configured to receive the control signal from the comparison sub-system 312. Further, the communication unit 328 is communicatively coupled to the control unit 326 of the WPT system 304.

The alignment parameters, such as but not limited to a current pattern, a voltage pattern, a differential current or voltage patterns, may be received by the comparison sub-system 312 from the detection coils of the detection mat 308. In one embodiment, the comparison sub-system 312 is configured to receive a differential current signal and configured to convert the differential current signal to a voltage signal, referred to as an alignment voltage signal. In some embodiments, the alignment voltage signal is compared to a threshold value or a threshold voltage signal. If a value of the threshold voltage signal is greater than a value of the threshold voltage signal, it indicates a misalignment between the transmitter and receiver units 320 and 324. A control signal representative of a misalignment or a proper alignment may be communicated to the control unit 326. The control signal may be communicated by the comparison sub-system 312 or the communication unit 328 to the control unit 326 of the WPT system. If the control signal indicates alignment, the charging may be commenced. Alternatively, if the control signal indicates misalignment, the receiver unit 324 may be repositioned to an alignment position, and then charging may be commenced. In some embodiments, alignment parameters may be determined again for the alignment position and once the control signal indicates that the units 320 and 324 are aligned with respect to one another, the charging may be commenced. In the illustrated embodiment, an original position of the receiver unit 324 is indicated by reference numeral 330 and an adjusted position of the receiver unit 324 is represented by reference numeral 332.

Figure 4:
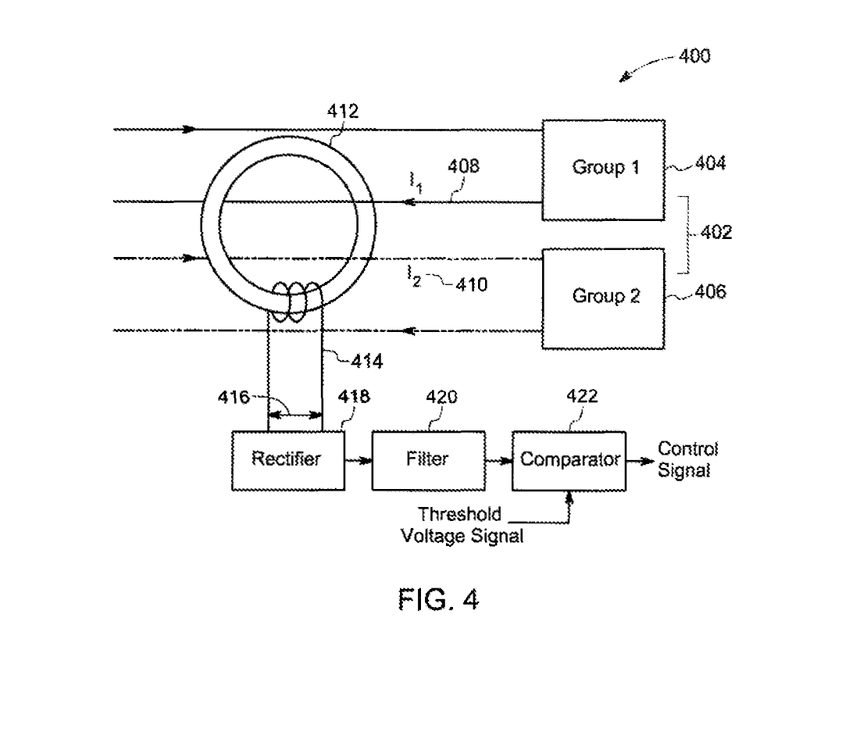
FIG. 4 is a diagrammatical representation of an example comparison sub-system of a detection device, in accordance with aspects of the present specification.

FIG. 4 illustrates an example of a comparison sub-system 400 operatively coupled to a pair 402 of groups 404 and 406 of detection coils of a detection mat. The illustrated example of FIG. 4 is a non-limiting example of measuring a differential current, it may be noted that other methods for measuring differential current may also be employed in the present specification, where other methods may include sensing individual currents and finding the difference between the individual current using electronics, such as, but not limited to, a differential amplifier. A differential current signal from the pair 402 may be determined by using an ongoing current signal to one group and a returning current signal from the other group of the pair of groups. In the illustrated embodiment, a retuning current signal $I_1$ 408 from the group 404 and an ongoing current signal $I_2$ 410 from the group 406 are used to derive the differential current signal for the pair 402.

Upon receiving the two current signals 408 and 410, a magnetic core 412 generates flux linkage and induces a corresponding alignment voltage signal, represented generally by reference numeral 416, in an electrical winding 414 wound around the magnetic core 412.

The comparison sub-system 400 also includes a rectifier 418 that receives and rectifies the alignment voltage signal. An optional filter 420 filters the voltage signal before sending the same to a comparator 422. In one example, the filter 420 is configured to filter out high frequency components from the measurement. The comparator 422 compares the filtered voltage signal with a threshold voltage signal, and accordingly a control signal is communicated to the WPT system, a user of an EV, an operator of an EV charging station, or combinations thereof.

Figure 5:
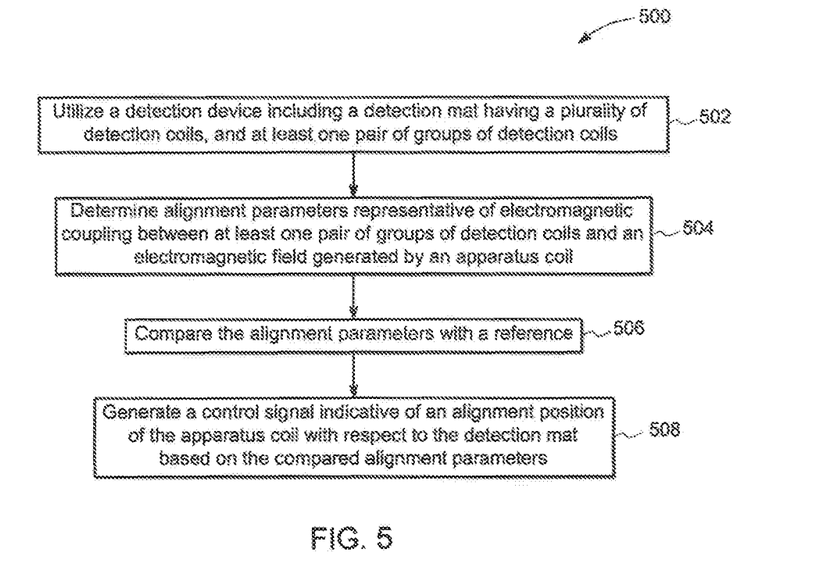
FIG. 5 is an example method for determining an alignment between a detection mat and an apparatus coil, in accordance with aspects of the present specification.

FIG. 5 illustrates a method flow chart 500. The method may be used for determining an alignment between a detection mat and an apparatus coil. In some embodiments, the method may be used for determining an alignment in a WPT system. In some of these embodiments, the apparatus coil may be a receiver coil of a receiver unit of the WPT system or a transmitter coil of a transmitter unit of the WPT system. The receiver unit may be coupled to an apparatus, such as an electric vehicle. In some embodiments, an external power supply, such as a battery of a EV vehicle that needs to be charged may be provided.

At block 502, a detection device including a detection mat having a plurality of detection coils is utilized. The detection mat also includes at least one pair of groups of detection coils, where the at least one pair of groups of detection coils includes a first group of detection coils and a second group of detection coils. The first group of detection coils includes a first impedance value, and a second group of detection coils includes a second impedance value In some embodiments, where the receiver coil is the apparatus coil, the detection mat of the detection device may be disposed on and aligned with the transmitter unit of the WPT system. By way of example, the detection mat may be in physical contact with at least a portion of a surface of the transmitter unit. In some other embodiments, the detection mat is positioned at a determined distance from a surface of the transmitter unit, such that the detection mat is positioned directly above and aligned with the transmitter unit and placed between the transmitter unit and the receiver unit. The detection mat is considered to be aligned with the transmitter unit or the receiver unit when the detection mat is symmetrically disposed with respect to the transmitter and receiver coils of the transmitter and receiver units, respectively.

At block 504, alignment parameters representative of electromagnetic coupling between the detection coils of the detection mat and an electromagnetic field generated by an apparatus coil are determined. In one example, the apparatus coil may be the receiver coil or the transmitter coil of the WPT system. In some embodiments, the electromagnetic field is created by providing a voltage signal to the apparatus coil, such as a receiver coil using receiver electronics or an external power supply. In a non-limiting example, the receiver coil may be energized using the battery of the car. In one embodiment, determining the alignment parameters includes sensing the alignment parameters using current and/or voltage sensors.

In some embodiments, the alignment parameters may be determined for at least one pair of groups detection coils disposed at diagonally opposite ends of the detection mat. The alignment parameters may be determined for one or more pairs of groups of detection coils. In certain embodiments, the alignment parameters may be determined for groups of detection coils of two diagonally opposite detection zones. Further, the alignment parameters may be determined for two or more pairs of detection zones, which are located at diagonally opposite positions on the detection mat.

The alignment parameters may include an actual voltage pattern, an actual current pattern, a differential current pattern, a differential voltage pattern, or combinations thereof. In certain embodiments, an amplitude, a phase, or both of at least one of the actual voltage pattern, the actual current pattern, the differential current pattern, and the differential voltage pattern may be determined. In one embodiment, the step of determining the alignment parameters include determining a differential current signal between a pair of groups of detection coils. Further, at least one actual current signal from at least one group of detection coils is also determined by terminating that particular group using a standard impedance.

At block 506, the alignment parameters may be compared with a reference. This reference may be in the form a reference table or a threshold value. By way of example, differential current patterns and actual current patterns may be determined for one or more pairs of groups of detection coils, or one or more pairs of detection zones.

At block 508, a control signal is generated, the control signal is indicative of an alignment position of the receiver coil with respect to the detection mat based on the compared alignment parameters. The alignment position can be defined as a position that provides optimal alignment between the apparatus coil, such as the receiver coil of the receiver unit, and the detection mat.

The method further includes generating a recommendation, in the form of a control signal, for repositioning the apparatus coil with respect to the detection mat, such as the receiver unit with respect to the transmitter unit. In one example, the method 500 may also include transmitting the control signal regarding directions for movement of the receiver coil for the alignment position of the receiver unit for aligning the WPT system. The recommendations may be a set of co-ordinates, relative distance between the current position and the determined alignment position based on the control signal and control signal. The recommendations of the control signal may be provided by the comparison sub-system or communication unit of the detection device or the control unit of the WPT system. Further, the recommendations for aligning the apparatus coil may be provided to the end user of the EV by means of visual display, display of electric vehicles infotainment system.

In some embodiments, the method further includes the step of repositioning the apparatus coil with respect to the detection mat based on the control signal. In one example, the method includes repositioning the receiver coil with respect to the detection mat based on the control signal. The step of repositioning may include moving the receiver coil to the alignment position to obtain a determined actual current pattern, a determined actual voltage pattern, a determined differential current pattern, a determined differential voltage pattern, or combinations thereof, for the detection mat.

The method for determining the alignment may be performed in real-time or near real-time. Near real-time determination may be performed such that the control signal is generated and communicated in a period of few microseconds to few milliseconds from the time of starting the detection. Upon detection of misalignment and/or misalignment, a communication signal may be transmitted sent, for example to the apparatus coil.

As will be appreciated, the method is not restricted by the order of steps illustrated in the flow chart 500. Further, it may be noted that the method steps of determining an alignment in the WPT system may be performed before starting the wireless power transfer from the transmitter unit to the receiver unit. In some embodiments, after detecting the alignment but before starting the wireless power transfer, presence of a foreign object in an operative environment of the WPT system may be determined. The foreign object may be an object that is electrically conductive or has detectable magnetic permeability and that is not part of the alignment system or the WPT system but is inadvertently present in an operative environment of the system. Non-limiting examples of foreign objects may include a ferrous object, a tin can, or other electrically conductive or ferrous objects. In one example, a can or a bunch of keys are considered as foreign objects in the operative environment of the WPT system. Subsequently, the detection device may operate with the WPT system as per society of automotive engineers (SAE) standards.

Figure 6:
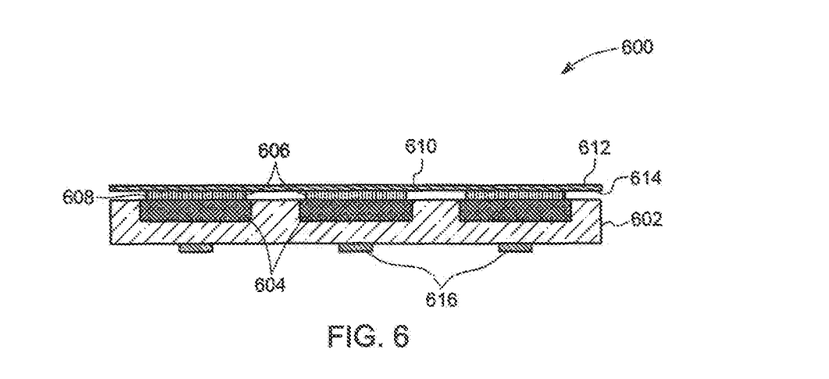
FIG. 6 is a cross sectional view of a detection mat, in accordance with aspects of the present specification.

FIG. 6 is a cross sectional view of a detection mat 600, in accordance with aspects of the present specification. In some embodiments, the detection mat 600 may be a stand-alone structure detachably coupled to a transmitter unit, such as the transmitter unit 320 of FIG. 3. In one example, the detection mat 600 may be a plug and play structure. The detection mat 600 includes a substrate 602 having one or more printed circuit boards (PCBs) 604. The substrate 602 may include electrically insulating materials. In some embodiments, the substrate 602 itself may be a printed circuit board (PCB).

Further, groups 606 of detection coils 608 may be disposed on the substrate 602. In one embodiment, the groups 606 of the detection coils 608 may be disposed on respective PCBs 604. In some embodiments, the detection coils 608 may be disposed on the substrate 602 or may be embedded in the substrate 602 for user safety and aesthetics. The detection coils 608 may also be printed on flexible or regular printed circuit board. In certain embodiments, the detection coils 608 may be printed, molded, woven, or additively manufactured on the substrate 608 or the PCBs 604. It may be noted that each of the detection coils 608 may be compact and wound within a thin gauge wire.

A cover layer 610 may be disposed on the detection coils 608. The cover layer 610 has a first side 612 and a second side 614. In certain embodiments, the detection coils 608 may be directly disposed on the second side 614 of the cover layer 610. In some of these embodiments, the detection coils 608 may not be disposed on the PCBs 604. Further, suitable electronics 616 may be provided to the substrate 602 to enable operative coupling of the detection mat 600 with a drive sub-system and a comparison sub-system of a detection device.

The substrate 602 and the cover layer 610 may include a flexible material, a hard material, or a combination thereof. The cover layer 610 includes a thermally conductive and electrically insulating (TCEI) material. In one embodiment, the thermally conductive and electrically insulating (TCEI) material may include elastomers or thermoplastics with fillers that are wear resistant. In one embodiment, the elastomers may be silicone rubber. The fillers may be TCEI fillers such as aluminum oxide, aluminum nitride, beryllium oxide, boron nitride, graphene oxide, silicon carbide, and silicon nitride. Similarly, the thermoplastics may be polyolefins, polycarbonate, poly (methyl-methacrylate) (PMMA), and polyesters. Also, in certain embodiments, the substrate 602 and the cover layer 610 may be foldable along with the detection coils 608. In one embodiment, the detection mat 600 may be a conformable structure. To that end, when the detection mat 600 is disposed on a transmitter unit, the detection mat 600 may be configured to generally conform to the gradients and curves of the surface of the transmitter unit. In some embodiments, the cover layer 610 may form an enclosure around the substrate 602, detection coils 608, and may be around the electronics 616

In one embodiment, the detection mat 600 may be integrated with a standard SAE transmitter system. In certain embodiments, dimensions of the detection mat 600 may be in a range from about 0.5 m to about 2.2 m. The detection mat 600 may be suitably large to cover a surface area of a transmitter coil. In some examples, the detection mat 600 may have a length in a range from about 0.5 m to about 2.2 m, and a width in a range from about 0.5 m to about 2.2 m. Also, the detection mat 600 may have a thickness that is in a range from about 1 mm to about 20 mm. In one embodiment, the detection mat 600 may be a unitary structure. In another embodiment, the detection mat 600 may be formed by integrating separate individual pieces.

The device, system and method of the present technique is simple in construction and does not require any complicated assembly. Further, the present technique is very sensitive and can be used to detect an alignment of the receiver and transmitter units in a time efficient manner before starting to charge the EV. This helps in minimizing the wastage of power. Embodiments of the present specification provide a high sensitivity, simple, and accurate system to detect the alignment in the WPT system. Further, the detection device of the present specification can be deployed in existing WPT systems, with minimal to no changes or adjustments required to be made in the existing WPT systems.

While only certain features of the invention have been illustrated and described herein, many modifications and changes will occur to those skilled in the art. It is, therefore, to be understood that the appended claims are intended to cover all such modifications and changes as fall within the scope of the invention.

We claim:

1. A method of a wireless power transfer (WPT) system, the method comprising:
   exciting a pair of groups of detection coils of a detection mat, the pair of groups of detection coils including a first group of detection coils and a second group of detection coils, wherein the first group of detection coils and the second group of detection coils are symmetrically disposed with respect to a primary magnetic field of a transmitter unit of the WPT system;
   obtaining a voltage signal from an electrical winding wound around a magnetic core through which currents of the first group of detection coils and the second group of detection coils are passed in opposite directions, the voltage signal representative of a differential current based on a difference between the first group of detection coils and the second group of detection coils when the pair of groups of detection coils is excited;
   generating a control signal based on a comparison of the voltage signal and a threshold; and
   controlling operation of the transmitter unit based, at least in part, on the control signal.

2. The method of claim 1, wherein determining the differential current includes:

sensing actual currents of the first group of detection coils and the second group of detection coils; and calculating the differential current based on a difference in the actual currents.

3. The method of claim 1, wherein the detection mat contacts at least a portion of a surface of the transmitter unit.

4. The method of claim 1, wherein detection mat is positioned at a determined distance from a surface of the transmitter unit, such that the detection mat is positioned directly above the transmitter unit and placed between the transmitter unit and the receiver unit.

5. The method of claim 1, further comprising:
repositioning an apparatus coil of the transmitter unit based on the control signal.

6. The method of claim 1, further comprising:
communicating a recommendation for aligning the apparatus coil based on the control signal.

7. The method of claim 1, wherein obtaining the voltage signal includes:
receiving, through the magnetic core, an outgoing current of the first group of detection coils and a returning current of the second group of detection coils, wherein the magnetic core provides flux linkage of the outgoing current and the returning current when the pair of groups of detection coils is excited; and
producing the voltage signal using a rectifier coupled to the electrical winding wound around the magnetic core.

8. A wireless power transfer (WPT) system, comprising:
a detection mat having a plurality of detection coils, a pair of groups of the plurality of detection coils including a first group of detection coils and a second group of detection coils, wherein the first group of detection coils and the second group of detection coils are symmetrically disposed with respect to a primary magnetic field of a transmitter unit of the WPT system;
a sensing unit and a comparison sub-system that:
obtain a voltage signal from an electrical winding wound around a magnetic core through which currents of the first group of detection coils and the second group of detection coils are passed in opposite directions, the voltage signal representative of a differential current based on a difference between the first group of detection coils and the second group of detection coils when the pair of groups of detection coils is excited, and
generate a control signal based on a comparison of the voltage signal and a threshold; and
a control unit that controls operation of the transmitter unit based, at least in part, on the control signal.

9. The WPT system of claim 8, further comprising a communication unit configured to transmit the control signal from comparison sub-system to the control unit.

10. The WPT system of claim 9, wherein the control unit is configured to communicate the control signal to the apparatus coil to reposition the apparatus coil based on the control signal.

11. The WPT system of claim 8, wherein the detection mat is disposed on the transmitter unit.

12. The WPT system of claim 8, further comprising a compensator element operatively coupled to at least one group of the pair, wherein the compensator compensates for dissimilar impedance values associated with first group of detection coils and the second group of detection coils such that the first group of detection coils and the second group of detection coils provide similar resultant impedance.

13. The WPT system of claim 8, further comprising:
the magnetic core that receives an outgoing current of the first group of detection coils and a returning current of the second group of detection coils, wherein the magnetic core provides flux linkage of the outgoing and returning currents when the pair is excited,
the electrical winding wound around the magnetic core, and
a rectifier that rectifies voltage of the electrical winding and produces the voltage signal.

14. A method of a wireless power transfer (WPT) system, the method comprising:
having a pair of groups of detection coils in a detection mat, the pair of groups of detection coils including a first group of detection coils and a second group of detection coils, wherein the first group of detection coils and the second group of detection coils are symmetrically disposed with respect to a primary magnetic field of a transmitter unit of the WPT system;
receiving, through a magnetic core, an outgoing current of the first group of detection coils and a returning current of the second group of detection coils, wherein the magnetic core provides flux linkage of the outgoing current and returning current when the pair of groups of detection coils is excited;
producing, via an electrical winding wound around the magnetic core, a voltage signal representative of a differential current of the pair;
generating a control signal based on a comparison of the voltage signal and a threshold; and
controlling operation of the transmitter unit based, at least in part, on the control signal.

* * * * *